United States Patent
Hills et al.

(10) Patent No.: US 7,703,516 B2
(45) Date of Patent: Apr. 27, 2010

(54) STIMULATING OILFIELDS USING DIFFERENT SCALE-INHIBITORS

(75) Inventors: Emma Hills, Leeds (GB); Sylvie Touzet, Antony (FR); Bruno Langlois, Paris (FR)

(73) Assignee: Rhodia Operations, Aubervilliers (FR)

( * ) Notice: Subject to any disclaimer, the term of this patent is extended or adjusted under 35 U.S.C. 154(b) by 494 days.

(21) Appl. No.: 10/562,055

(22) PCT Filed: Jun. 25, 2004

(86) PCT No.: PCT/EP2004/006975

§ 371 (c)(1),
(2), (4) Date: Apr. 16, 2007

(87) PCT Pub. No.: WO2005/001241

PCT Pub. Date: Jan. 6, 2005

(65) Prior Publication Data

US 2007/0267193 A1    Nov. 22, 2007

Related U.S. Application Data

(60) Provisional application No. 60/482,257, filed on Jun. 25, 2003, provisional application No. 60/482,271, filed on Jun. 25, 2003.

(51) Int. Cl.
*E21B 37/06*     (2006.01)
*E21B 43/14*     (2006.01)

(52) U.S. Cl. .................... 166/264; 166/252.6; 166/304; 166/400

(58) Field of Classification Search ........................ None
See application file for complete search history.

(56) References Cited

U.S. PATENT DOCUMENTS

| | | | |
|---|---|---|---|
| 4,741,400 A * | 5/1988 | Underdown | ................ 166/279 |
| 6,312,644 B1 | 11/2001 | Moriarty et al. | |
| 6,379,612 B1 | 4/2002 | Reizer et al. | |
| 2007/0142235 A1 | 6/2007 | Berger et al. | |

OTHER PUBLICATIONS

International Search Report Corresponding to PCT/EP2004/006975 Issued on Mar. 17, 2005, 4 Pages.

* cited by examiner

*Primary Examiner*—Zakiya W. Bates
(74) *Attorney, Agent, or Firm*—Buchanan Ingersoll & Rooney PC

(57) ABSTRACT

Oilfields are stimulated by injecting an inflow stream of a fluid into an oil producing well linked to the oilfield, displacing the oil and recovering an outflow stream of fluid comprising the oil, wherein at least two streams are injected into at least two production zones of an oil well or are injected into at least two different oil producing wells from which at least two outflow streams from the two zones or wells are combined before recovering, with a scale inhibitor having detectable moieties being introduced into the oilfield(s) and/or into the fluid, and wherein two different scale inhibitors are used, dedicated to the two zones or wells, said different scale inhibitors having different detectable moieties that can be distinguished by analysis.

13 Claims, No Drawings

STIMULATING OILFIELDS USING DIFFERENT SCALE-INHIBITORS

CROSS-REFERENCE TO PCT/PROVISIONAL APPLICATIONS

This application claims priority under 35 U.S.C. § 119 of U.S. Provisional Application No. 60/482,257, filed Jun. 25, 2003 and U.S. Provisional Application No. 60/482,271, filed Jun. 25, 2003, and is the National Phase of PCT/EP2004/006975, filed Jun. 25, 2004 and designating the United States, published on Jan. 6, 2005 as WO 2005/001241 A3, each hereby expressly incorporated by reference and each assigned to the assignee hereof.

BACKGROUND OF THE INVENTION

The invention relates to a method for stimulating an oilfield, comprising using a scale inhibitor. In oil recovery and, more importantly, in secondary oil recovery (where a fluid, preferably a water-based fluid, is injected into an oil well in order to displace the crude oil), scale formation may cause blockage of pipework and the pores in the oil-bearing strata, thus reducing or even preventing the flow of oil. Thus, the scale decreases oil recovery yields.

In order to address scale formation, scale-inhibiting polymers are known. Treatment levels up to a few hundred parts per million (ppm) are usually effective. The scale-inhibiting polymer is typically added to the fluid to be treated or may be applied to oil bearing formations by means of "squeeze treatment". Squeeze treatment involves pumping scale inhibitor into an oil production well so that the inhibitor enters the formation rock and is retained there. When the well is put back into production, the produced fluids are treated by the scale inhibitor which leaches out of the formation rock. Thus the scale inhibitor is released in a fluid. The scale inhibitor may be applied in an aqueous or non-aqueous medium. The objective is to prevent or control the scale formation in systems wherein the fluid is used.

Scale formation is only controlled if the scale inhibitor polymer is present at a treatment level within the product's defined effective range, for example of the minimum inhibitor concentration (MIC) of the specific system (water+scale inhibitor). During production, when the inhibitor has been released, for example by consumption, there is a need for re-squeezing. With squeeze treatment, the concentration of the scale inhibitor in the produced fluids will diminish over time till a repeat "re-squeeze" operation is necessary. Also, scale inhibitor may be lost through, e.g. adsorption or degradation. Hence, there is a need to replenish the scale inhibitor to replace this loss. The consequences of scaling is often catastrophic in this application and so it is most important to avoid scale. Overall, it can be seen that the concentration of scale inhibitor in the treated fluids is vitally important and chemical analysis of scale control polymers has always been difficult at ppm levels.

The problem of analysis has recently become more difficult in subsea oilfields because of subsea completions where several individual wells are commoned on the seabed and the combined fluids are piped to the nearest production platform which may be several tens of miles away. In that configuration, if the oil yield decreases in the recovered combined fluid, it is not possible to determine the particular well that has too much scale, and/or to determine the well wherein scale inhibitor should be added. Because of that it is sometimes necessary to stop the production for all the wells, or to add too much scale inhibitor (for example by adding to much scale inhibitor in a well wherein less is needed). That decreases the global productivity and/or is not cost effective.

BRIEF SUMMARY OF THE INVENTION

The invention addresses the above mentioned issues. Thus, the invention relates to a method for stimulating an oilfield by injecting an inflow stream of a fluid into an oil producing well linked to the oilfield, displacing the oil and recovering an outflow stream of fluid comprising the oil, wherein at least two streams are injected into at least two production zones of an oil well or are injected into at least two different oil producing wells from which at least two outflow streams from the two zones or wells are combined before recovering, with a scale inhibitor having detectable moieties being introduced into the oilfield(s) and/or into the fluids, characterized in that two different scale inhibitors are used, dedicated to the two zones or wells, said different scale inhibitors having different detectable moieties that can be distinguished by analyzing. These operations are also referred to as a production method.

Usually, the method further comprises measuring the amounts of the different scale inhibitors in the recovered fluid, or of a fluid derived therefrom, and if the amount of a scale inhibitor is below a given value, typically the minimum inhibitor concentration, addressing a scale formation problem that occurs in the zone or well the scale inhibitor is dedicated to.

The invention also relates to new different scale inhibiting polymers useful in carrying out the method above.

DETAILED DESCRIPTION OF THE INVENTION

Definitions

By polymer it is meant a macromolecular chain comprising repeating units. By copolymer, it is meant polymers comprising repeating units, and having at least two different units. Copolymers include polymers having two different repeating units, three different repeating units (sometimes referred to as ter-polymers) or more.

"MIC" refers to a minimum inhibitor concentration. The MIC can be evaluated according to a static jar test as described in NACS Standard TM 0197-97. Laboratory Screening test to Determine the Ability of Scale Inhibitors to prevent the precipitation of barium Sulfate and/or Strontium Sulfate from Solution (for Oil and Gas Production Systems), Item No. 21228, NACE International, 1997.

ICP analysis method refers to the Inductively Coupled Plasma analysis method. This analysis method is known by the one skilled in the art of detecting, identifying and/or quantifying single chemical elements.

Oil Recovery Process and Use of Scale Inhibitors

The method for stimulating an oilfield by injecting a fluid is know by the one skilled in the art. The method encompasses, but is not limited to, the method known as "waterflooding".

Water flooding is a commonly used technique in oil recovery operations. Water is injected under pressure into the formation water reservoir via injection wells; this procedure drives the oil through the mineral deposits and rock formations into the production wells. The displaced oil is then recovered in an outflow stream comprising the water and the oil. Sea water, readily available in offshore operations, and typically used for the injection water in the water flooding operation, contains large amounts of dissolved salts, such as sulfate. Interaction of the injection water (in the absence of effective scale inhibitors) with the formation water in the reservoir will produce unwanted inorganic deposits (primarily scale-forming salts of calcium sulfate, barium sulfate and strontium sulfate) which ultimately block tubing, valves and pumps of the oil recovery process equipment. Additional conditions that aggravate the deposition of scale-forming salts include, pressure, high temperatures and high concentrations of barium, strontium, calcium or iron ions encountered in typical oil recovery operations.

In order to address the scale-formation problem, a "squeeze" process can be used. Generally, the well is initially preflushed with sea water, optionally treated with spearhead compounds such as surfactant for conditioning the rocks, then a scale inhibitor-containing injection step is performed; this is followed by an additional sea water feed (over flush step) to distribute the scale inhibitor further into the reservoir to be adsorbed within the mineral deposits and rock formations (matrix of the underground petroleum-bearing formation). During the squeeze treatment, oil recovery operations are curtailed. When oil production operations are resumed, the adsorbed scale inhibitor will be slowly released (desorbed or dissolved) from the formation matrix and prevent the precipitation of scale-forming salts during subsequent oil recovery operations. For oilfields characterized by "harsh" conditions (such as high barium levels or low pH), typical time periods before additional squeeze treatments are required (squeeze lifetime) are 1 to 6 months; desired squeeze lifetimes are 6 to 24 months, preferably 12 to 24 months or longer. The harsher the conditions, the greater the tendency for metal sulfate scale formation with consequent plugging and fouling of the oilfield matrix and oil production equipment.

In order to address the scale-formation problem, it is also possible to add a scale inhibitor directly in the injected fluid (usually a water-based fluid, preferably a seawater-based fluid).

Useful techniques also include deployment via macaroni strings or placement in the rat hole of the well.

If a squeeze treatment is used, a fluid comprising the scale-inhibiting polymer is understood either as a fluid used to force the scale-inhibiting polymer into a well or an formation rock, or a fluid wherein said scale-inhibiting polymer has been released.

Down-hole chemical deployment is routinely and effectively effected by squeeze treatments, which protect both the production well-bore and near well-bore formation out to a radius of around 20 feet. This batch technique involves deferring oil production while chemical is pumped down the production well and into the formation, shutting in the well to allow the chemical to interact with the formation rock, then recommencing production. The chemical is slowly released from the rock, returning to the surface in produced fluids. Protection from scaling requires inhibitor levels in produced fluids to be above MIC. With high inhibitor-to-formation adsorption slow returns are seen at lower concentrations (adsorption must be optimised giving the required MIC). These returns protect greater volumes of produced fluids, extending squeeze lifetime. The squeeze is repeated when inhibitor levels in produced fluids approach MIC.

The major aim a 'tagged' polymeric inhibitor is to insure against scaling in large investment, sub-sea complex developments. However the costs of squeeze treatments in these wells is huge, mainly due to deferred oil and access costs. By comparison the inhibitor chemical costs are minor. So any reduction in squeeze intervals in these wells, due to better inhibitor analysis from different wells, would be a clear cost saving. In addition several functional groups encourage adsorption to the formation rock and it is surmised that a subsidiary consequence of incorporating a hydrophobic 'tag' into polymers may be increased inhibitor formation adsorption.

The main stages of squeeze operations can include the following:

(i) pre-flush: This consists of a dilute solution of inhibitor in seawater often containing a surfactant or demulsifier. It is intended to cool the formation, so reducing near-well bore adsorption and propagating inhibitor further into the formation. Of equal importance is the displacement of formation water and creation of a buffer zone to avoid any incompatibilities with the high concentrations of inhibitor injected, especially when high salinity/high calcium ion formation waters are involved. The pre-flush may also remove residual surface oil to increase water wetness.

(ii) inhibitor injection: The main inhibitor treatment is typically 5-10% active inhibitor in seawater. Modelling both the maximum inhibitor adsorption (from the isotherm, obtained either from core floods or more accurately from history matching) and the surface area available for adsorption identifies optimum inhibitor concentrations and volumes to maximize squeeze lifetime without the injection of surplus chemical.

(iii) over-flush: The majority of the fluid volume is injected at this stage. The fluid is designed to flush the inhibitor slug further into the formation to a radial distance of 8 to 15 feet. This increases the surface area of rock the inhibitor encounters and increases adsorption levels. It also displaces inhibitor from the cooled near well-bore into the hotter formation where greater adsorption takes place. Modeling the injected volume balances increased squeeze lifetime with lifting demands on recommencing production and the potential to change the wettability of the formation. There is also a risk that the inhibitor will returns at levels below MIC if injected too far into the formation.

(iv) 'shut-in': The well is left to allow the inhibitor to adsorb to the rock. Shut in times are typically 6 to 12 hours, depending on the length of time needed for inhibitor adsorption to reach equilibrium. At higher temperature adsorption rates are higher and shut-in periods can be reduced. Modelling balances the level of adsorbed inhibitor against deferred oil costs.

(iv) back production: Production is recommenced in the original direction of flow. The inhibitor desorbs from the formation rock and returns to the surface in the produced fluids.

In the method according to the invention, there is at least two productions zones or at least two oil wells being simulated or used simultaneously. Thus, at least two streams of fluid are injected into the production zones, or are injected into the oil producing wells. Two outflow streams comprising the oil are obtained. The two streams are combined to obtain a single recovered stream of a fluid comprising the oil. The combination of the outflow streams is usually carried out on the seabed, and the single recovered stream is usually piped to a production facility such as an oil production platform. This configuration, wherein outflow streams are combined, simplifies the operations and/or allows efficiently stimulating as many wells or zones as practical and/or cost effective. A scale inhibitor is used as mentioned above, either according to a squeeze treatment, by injecting by introducing said inhibitor in the oilfield (in the different production zones or wells), before stimulating, or by addition directly into the fluid(s).

According to the invention, different scale inhibitors are used, said different scale inhibitors being dedicated to the different zones or wells. The different scale inhibitors have different detectable moieties that can be distinguished by analyzing. The different moieties are also referred to as tags. The scale inhibitors are different because of the different moieties. The other groups, moieties or units might be identical in the different scale inhibitors. In other words, the difference between the different scale inhibitor may consists only of the detectable moieties or tags.

Using the different scale inhibitors having the different detectable moieties allows analyzing the amount of said scale inhibitors in the combined recovered fluid, and thus, as the scale inhibitors are dedicated to a zone or a well, determine the particular zone or well that has too much scale, and/or to determine the zone or well wherein scale inhibitor should be introduced. This introduction of scale inhibitor can be performed by adding scale inhibitor to the particular fluid, or by squeezing or re-squeezing the zone or well. That avoids adding scale inhibitors in zone or wells wherein it is not needed, and/or stopping simultaneously the production in all the zones or wells for a re-squeeze of all the zones or wells.

Thus, the method according to the invention usually comprises measuring the amounts of the different scale inhibitors in the recovered fluid, or of a fluid derived therefrom, and if the amount of a scale inhibitor is below a given value, for example the MIC, addressing a scale problem that occurs in the zone or well the scale inhibitor is dedicated to. Shortly, the scale problem is addressed by introducing the dedicated scale inhibitor into the fluid for the particular zone or well having a scale problem, or by introducing more dedicated scale inhibitor into said fluid, or by introduced the dedicated scale inhibitor into the particular oilfield having a scale problem according to a squeeze treatment. The introduction of the dedicated scale inhibitors is preferably carried out without stopping the production of the other zones or wells.

For example, the scale inhibitor is introduced into the water based fluid, or more scale inhibitor is introduced into the fluid, or the scale inhibitor is introduced into the oilfield according to a squeeze treatment.

According to a first embodiment of the invention, the scale inhibitors are introduced, for example periodically, continuously, continually, or when needed according to analysis, into the fluid. More precisely, the scale inhibitor is introduced the into the fluid for the zone or well it is dedicated to. The amount and frequency may vary according to analysis performed on the combined recovered fluid.

According to a second embodiment of the invention, the different scale inhibitors are introduced into the oilfield before stimulating (i.e. before efficiently displacing the crude oil), by forcing different said inhibitors into the oilfield (into different zones or via different wells), according to a squeeze treatment. More precisely, the scale inhibitor is forced (or squeezed) into different zones or via different wells, for the zone or well it is dedicated to. The frequency of squeezing (or re-squeezing) operations for the different zones or wells may vary according to analysis performed on the combined recovered fluid. The squeezing procedure may of course comprise any other step useful in such a procedure, such as prefushing the zone with seawater. Squeezing operations and formulations are known by the one skilled in the art of oil recovery.

Analysis, or measuring the amounts of the different scale inhibitors in the recovered fluid, can be carried out by any method suitable for detecting the different moieties or tags. In a preferred embodiment, all the scale-inhibitors can be distinguished by a single analysis method. According to this embodiment, the step of measuring the amounts of the different scale inhibitors is carried out with using a single apparatus.

The analysis method(s) depend on the detectable moieties. Suitable analysis methods include Induced Coupled Plasma, fluorometry, and colorimetry. Some preferred methods are described below, for some preferred moieties, and scale inhibitors.

Scale Inhibitors

The different scale inhibitors are chemical compounds having different detectable moieties (tags) and optionally identical or different other groups, moieties or units. Preferred scale inhibitors are tagged scale-inhibiting polymers having scale inhibiting units and tagging units.

Example of preferred different detectable moieties include moieties selected from the group consisting of:
a) atom-marked moieties, comprising at least one atom selected from the group consisting of boron, silicon, and germanium,
b) moieties deriving from acetoxy-styrene, preferably 4-acetoxy-styrene, or from ortho-allyl phenol.
c) moieties deriving from a monomer having the following formula:

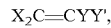

wherein:
X, which is identical or different, is a hydrogen atom, or a $C_1$-$C_4$ alkyl group,
Y, is a hydrogen atom or a $C_1$-$C_4$ alkyl group,
Y' is a group having formula -L-Arom, wherein
L is a covalent bound or a divalent organic linking group optionally comprising heteroatoms, and
Arom is a group comprising at least two conjugated aromatic rings, preferably at least three, said rings comprising conjugated carbon atoms, and optionally nitrogen or oxygen atoms, and, linked to said carbon atoms, hydrogen atoms or substituants,
d) moieties obtained by reacting, after polymerization, units deriving from vinyl-benzyl chloride with
8-aminopyrene-1,3,6-trisulfonic acid or,
9-(2-(ethoxycarbonyl)phenyl)-3,6-bis(ethylamino)-2,7-dimethylxanthylium chloride (Rhodamine 6G), or
CellTracker Blue CMAC, or salts thereof,
e) moieties deriving from the monomer obtained by reacting vinyl-benzyl chloride with 8-aminopyrene-1,3,6-trisulfonic acid or a salt thereof,
f) moieties comprising at least one phosphate or phosphonate group,
g) moieties comprising at least one sulfonate or sulfonic acid group.

More details about these moieties are provided below, as moieties of units of a polymer.

Examples of different scale inhibitors that can be used include scale inhibitors described in the following documents, that are incorporated by reference: GB2152937; WO2001007430; WO98/02492; U.S. Pat. No. 5,808,103; U.S. Pat. No. 6,312,644; U.S. Pat. No. 5,171,450; U.S. Pat. No. 5,043,406; U.S. Pat. No. 4,999,456; U.S. Pat. No. 4,813,973; WO2001081654; U.S. Pat. No. 5,986,030; WO2001007430; U.S. Pat. No. 4,194,877; EP647,598; U.S. Pat. No. 5,378,784; U.S. Pat. No. 6,077,461; WO00/53235; U.S. Pat. No. 6,218,491; U.S. Pat. No. 5,171,450; U.S. Pat. No. 5,260,386; U.S. Pat. No. 5,216,086; U.S. Pat. No. 5,128,419; U.S. Pat. No. 4,813,973; EP657,474; U.S. Pat. No. 6,040,406; WO9735192; EP0,613,863; U.S. Pat. No. 5,389,548; U.S. Pat. No. 4,894,346, EP 861846.

Useful scale inhibiting polymers also include phosphorus end-capped polymers, polyaspartate polymers, polyvinyl sulfonates polymers or copolymers, polyacrylic acid based polymers.

Other examples of scale inhibitors that can be used include the scale inhibitors described in document WO 03/029153, that is incorporated by reference. These scale inhibitors comprise a phosphate moiety that is detectable by I.C.P. Thus, one of the different scale inhibitors can be a polymer having at least a phosphate moiety, formed from monomers selected from the group consisting of at least one ethylenically unsaturated (di)carboxylic acid monomer, at least one ethylenically unsaturated vinyl sulfonate monomer, and mixtures thereof.

Tagged Scale-Inhibiting Copolymer

The different scale inhibitors, all or some of them, are advantageously tagged scale inhibiting polymers comprising at least two different units: scale-inhibiting units and tagging units. As the polymer comprises at least these two different units, the polymer can be also referred to as a copolymer. The scale inhibiting units prevent scale-formation. The tagging units are detectable by an analysis method. It is not excluded that the tagging units also prevent scale formation. It is not excluded that the scale-inhibiting units be detectable.

The polymers are obtained by polymerizing monomers, and then optionally further reacting the polymer obtained with a compound in order to chemically modify at least a number of target units incorporated for their potential to form covalent bonds with the introduced compound. This further reaction is hereafter referred to as a post-polymerization reaction. The post-polymerization reaction is usually carried out in order the modify units of the polymer that will constitute tagging units.

Any polymerization method can be used to prepare the polymers. Free-radical polymerization methods are preferred. Suitable methods include aqueous bulk/dispersion polymerization, solution polymerization, or emulsion polymerization. The preferred polymerization process is solution polymerization. According to such a process water is charged to a reaction vessel fitted with a mechanical stirrer and water condenser and heated to 90° C. To this may be added polymerization initiators or these may be fed in later. The 'tagged' monomer may also be added to this charge, added to the polymer feed or fed in separately. A monomer feed(s), soluble initiator feed and optionally a chain transfer reagent feed are added to the vessel over 6 hours. Post polymerization neutralization to the required level is carried out with a suitable salt. These processes and methods are known by the one skilled in the art.

New Scale Inhibiting Polymers

The new scale-inhibiting polymers useful in carrying out the method are scale-inhibiting polymer comprising scale inhibiting units and tagging units, wherein the tagging units are selected from the group consisting of:

a) atom-marked units, comprising at least one atom selected from the group consisting of boron, silicon, and germanium, b) units deriving from acetoxy-styrene, preferably 4-acetoxy-styrene, or from ortho-allyl phenol, c) units deriving from a monomer having the following formula:

$X_2C=CYY'$, wherein:

X, which is identical or different, is a hydrogen atom, or a $C_1$-$C_4$ alkyl group, Y, is a hydrogen atom or a $C_1$-$C_4$ alkyl group, Y' is a group having formula -L-Arom, wherein L is a covalent bound or a divalent organic linking group optionally comprising heteroatoms, and Arom is a group comprising at least two conjugated aromatic rings, preferably at least three, said rings comprising conjugated carbon atoms, and optionally nitrogen or oxygen atoms, and, linked to said carbon atoms, hydrogen atoms or substituents, d) units obtained by reacting, after polymerization, units deriving from vinyl-benzyl chloride with 8-aminopyrene-1,3,6-trisulfonic acid, 9-(2-(ethoxycarbonyl)phenyl)3,6-bis(ethylamino)-2,7-dimethylxanthylium chloride (Rhodamine 6G), or CellTracker Blue CMAC, or salts thereof, and e) units deriving from the monomer obtained by reacting vinyl-benzyl chloride with 8-aminopyrene-1,3,6-trisulfonic acid or a salt thereof.

a) In an embodiment, the tagging units of the copolymer are atom-marked units, comprising at least one atom selected from the group consisting of boron, silicon, and germanium. These units can be detected by any method appropriate for detecting a boron, silicon, or germanium atom, such as ICP. Boron can also be detected (0-14 mg/l) by its reaction with carminic acid and detected photometrically. Low silica levels (0-1.6 mg/l) can also be detected in the same way as phosphorous, using its reaction with molybdate blue to give silicomolybdic acid, which can be reduced with an amino acid to give an intense blue color proportional to the silica concentration. The reference for both these analytical techniques is the HACH Water Analysis Handbook).

Any unit comprising the above-mentioned atoms may be used as a tagging unit. The units may derive from monomers comprising said atom, before polymerizing. The units may also obtained according to a post-polymerization scheme, by reacting precursor units with a compound comprising the atom.

a1) Examples of atom-marked units include units comprising a boronate or boric group, such as:

a1.1) units deriving from 4-vinyl-benzyl-boronic acid or 4-vinyl-benzyl-boronic boronate (VBB), acryloylbenzene boronic acid or acryloylbenzene boronate, methacryloylbenzene boronic acid or methacryloylbenzene boronate, 3-aclylamodiphenyl boric acid or, 3-aclylamodiphenyl boronate, 3-mehtaclylamodiphenyl boric acid or, 3-mehtaclylamodiphenyl boronate,

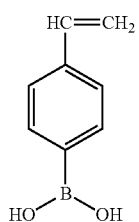

vinyl bensyl boronate (VBB)/
4-vinyl phenyl boronic acid a1.2) units obtained reacting, by after polymerization, units comprising a trimethylsilane group and BBr₃, and optionally further reacting with an alcohol.

a2) Examples of atom-marked units also include units obtained by reacting, after polymerization, units deriving from glycerol monomethylacrylate and a boron containing compound such as boric acid or boronic acid (hydroboration reaction).

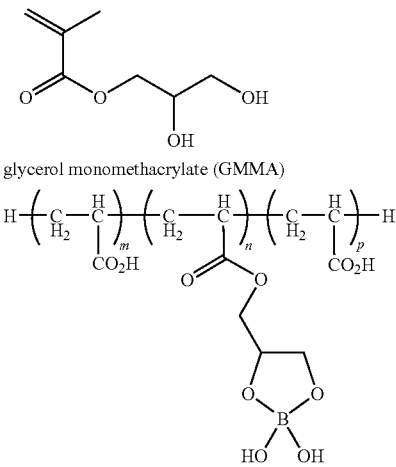

glycerol monomethacrylate (GMMA)

a3) Examples of atom-marked units also include allyl triethyl germanium,

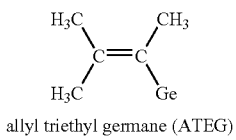

allyl triethyl germane (ATEG)

a4) Examples of atom-marked units also include vinyl trialkyl silane, such as vinyl trimethyl silane.

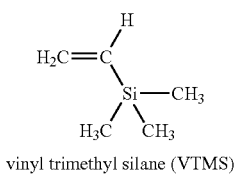

vinyl trimethyl silane (VTMS)

b) In another embodiment, the tagging units of the copolymer are units deriving from acetoxy-styrene, preferably 4-acetoxy-styrene, preferably hydrolyzed, or from ortho-allyl phenol (it is the alcohol which reacts with the diazonium). These units can be detected by any appropriate method, such as a colorimetric method, after exposure to a detection reagent such as a diazonium salt. The color intensity produced by the reaction product can be measured with a UV/visible spectrophotometer. A suitable diazonium salt is p-nitrobenzene diazonium hexafluorophosphate. It is considered that the color intensity is related to reaction product concentration (which is equivalent to polymer concentration) by the Beer-Lambert Law. Polymer concentrations are assigned by comparison of the color intensity of the polymer sample with a calibration plot obtained from polymer samples of a known concentration.

To enable the reaction to take place the 4-acetocy styrene must have its ester group hydrolyzed to the alcohol by boiling the solution. Absorbance can be measured at 500 nm. The following scheme is an example with ortho-allyl phenol:

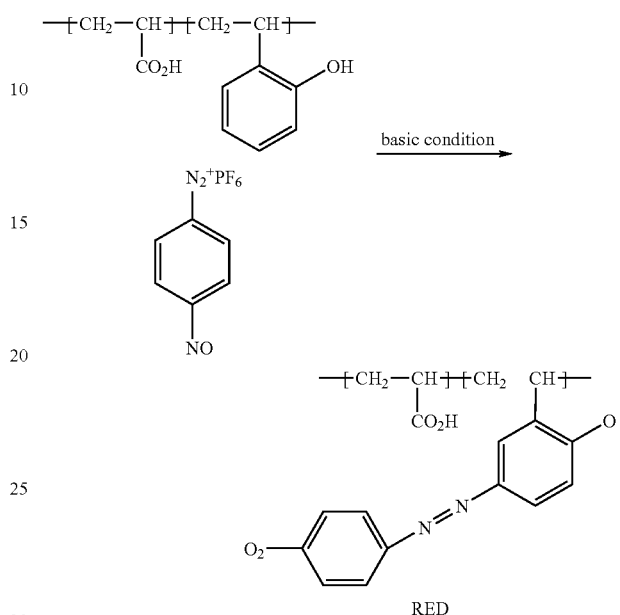

c) In another embodiment, the tagging units of the copolymer are units deriving units deriving from a monomer having the following formula:

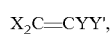

$X_2C=CYY'$, wherein:

X, which is identical or different, is a hydrogen atom, or a $C_1$-$C_4$ alkyl group, Y, is a hydrogen atom or a $C_1$-$C_4$ alkyl group, Y' is a group having formula -L-Arom, wherein L is a covalent bound or a divalent organic linking group optionally comprising heteroatoms, and Arom is a group comprising at least two conjugated aromatic rings, preferably at least three, said rings comprising conjugated carbon atoms, and optionally nitrogen or oxygen atoms, and, linked to said carbon atoms, hydrogen atoms or substituants.

Arom is preferably a group having at least 10 conjugated carbon atoms, preferably at least 14 carbon atoms in at least three conjugated aromatic rings.

The conjugated aromatic rings are preferably $C_5$ or $C_6$ rings.

Arom is advantageously a group having a naphtalene, an anthracene, a pyrene or a phenanthrene moiety, said moiety having optionally substituants.

L is preferably a covalent bound or a divalent $C_1$-$C_{12}$ alkyl group, or a group having formula —O—, —CO—O—, CO—NH—, or —O—CO—.

Especially preferred tagging units are units deriving from vinyl anthracene, preferably from 9-vinyl anthracene.

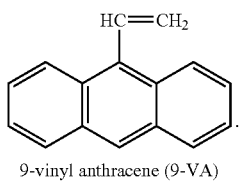

9-vinyl anthracene (9-VA)

Preferably, at least one of the different scale inhibitors is a tagged scale inhibiting polymer comprising tagging units deriving from 9-vinyl anthracene.

Other units include units deriving from α-vinylnaphthalene, 1-vinylpyrene, 4-vinyl-9,10-diphenylanthracene, 3-vinylphenanthrene, 9-vinylacridine.

These units can be detected by any method appropriate, such as Fluorometry, for example using a fixed wavelength fluorometer. Usually, detection is at the polymer maxima excitation (ex) and emission (em) wavelenghts. These can be determined using a scanning fluorometer in scanning mode. It is considered that the level of fluorescence is determined by the Beer-Lambert Law. Polymer concentrations are thus assigned by comparision of the emission intensity of the polymer sample with a calibration plot obtained from polymer samples of a known concentration.

d) In another embodiment, the tagging units are units obtained by reacting, after polymerization, units deriving from vinyl-benzyl chloride with:

8-aminopyrene-1,3,6-trisulfonic acid or, 9-(2-(ethoxycarbonyl)phenyl)3,6-bis(ethylamino)-2,7-dimethylxanthylium chloride (Rhodamine 6G), or CellTracker Blue CMAC, or salts thereof.

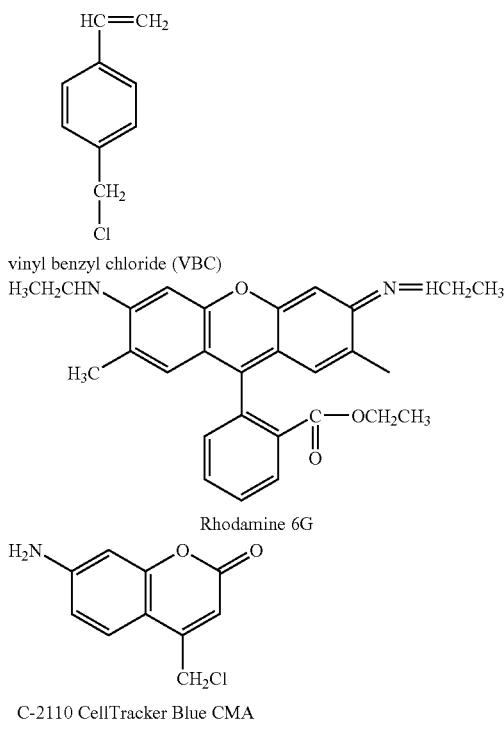

vinyl benzyl chloride (VBC)

Rhodamine 6G

C-2110 CellTracker Blue CMA

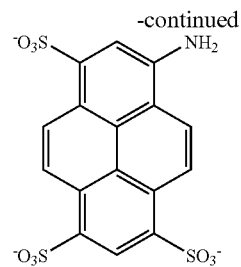

8-aminopyrene-1,3,6-trisulfonic acid (APTS)

These units can be determined using a scanning fluorometer in scanning mode. It is considered that the level of fluorescence is determined by the Beer-Lambert Law. Polymer concentrations are thus assigned by comparison of the emission intensity of the polymer sample with a calibration plot obtained from polymer samples of a known concentration. Examples of values are provided below, without any intention to limit the scope of the invention.

| Co-polymer | Excitation wavelength (nm) | Emission wavelength (nm) |
|---|---|---|
| AA*/0.01 mole % Rhodamine 6G | 520 | 550 |
| AA*/0.1 mole % Rhodamine 6G | 520 | 550 |
| AA* - 0.1 mole % 9-vinyl anthracene co-polymer | 260 | 410 |
| AA* - 0.05 mole % 9-vinyl anthracene co-polymer | 260 | 410 |
| AA* - 0.01 mole % 9-vinyl anthracene co-polymer | 300 | 380 |

*Acrylic Acid f) In another embodiment the tagging units are units comprising at least one phosphate or phosphonate group, such as units deriving from phosphate(meth)acrylate, and (meth)allyl hydroxy phosphates. These units can be detected by any method appropriate, such as ICP.

g) In another embodiment the tagging units are units comprising at least one sulfonate or sulfonic acid group, such as styrene sulfonate and styrene sulfonic acid. These units can be detected by any method appropriate, such as a colorimetric method, for example by UV/visible spectroscopy, at a maximum absorbance. It is considered that the color intensity is related to polymer concentration by the Beer-Lambert Law. Polymer concentrations are assigned by comparison of the color intensity of the polymer sample with a calibration plot obtained from polymer samples of a known concentration. These kind of analysis are known by the one skilled in the art.

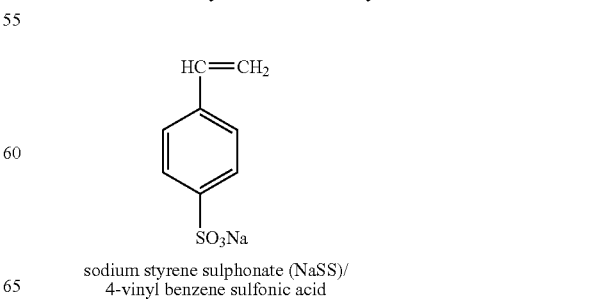

sodium styrene sulphonate (NaSS)/
4-vinyl benzene sulfonic acid

Scale Inhibiting Units

The scale-inhibiting units are preferably selected from the group consisting of:
vinyl sulfonic acid, or vinyl sulfonates salts,
vinyl phosphonic acid, or vinyl phosphonates salts,
vinylidene diphosphonic acid, or salts thereof,
acrylic acid,
methacrylic acid,
vinyl acetate,
vinyl alcohol,
unsaturated mono or di carboxylic acids or anhydrides different, such as maleic anhydride, maleic acid, fumaric acid, itaconic acid, aconitic acid, mesaconic acid, citraconic acid, crotonic acid isocrotonic acid, angelic acid, tiglic acid,
vinyl chloride,
styrene-p-sulfonic acid, or styrene sulfonates salts,
acrylamido-2-methylpropanesulfonic acid (AMPS),
hydroxyphosphonoacetic acid (HPA),
hypophosphorus acids such as $H_3PO_3$, giving units of formula —PO(OH)—,
acrylamides,
propargyl alcohol having formula $HC\equiv C-CH_2-OH$,
butyr-1,4-diol, and
mixtures thereof.

It is mentioned that monomers incorporating a hydroxyl group (for example HPA or vinyl alcohol) may aid adsorption to barium sulfate crystals, alcohol group giving good adsorption to crystal active growth sites, effectively blocking them, useful for high Ca brines, which inactivate other acidic functional groups. Monomers incorporating an amine group may aid adsorption to calcium carbonate crystals. Other sulfonated monomers (for example AMPS or vinyl sulfonic acid or sulfonates salts) may aid brine compatibility.

Other Units (Other Function)

While the above-mentioned units are usually comprised in the polymer backbone, it is mentioned the copolymer may comprise other units and/or other groups. The other groups include groups that are linked to at least one polymer end. These groups can result from a polymerization initiator or can be end-capping groups. They might have no particular function, or might constitute scale-inhibiting groups, tagging groups, or groups helping in formulating the inhibitor, or other.

Thus, other groups or units include groups or units having formula $X''_2O_3P-CHY''CZ''_2PO_2X''-$, wherein X'' is H or an alkali metal, alkaline earth or other polyvalent metal, ammonium or an organic base, groups, Y'' and each Z'', which may be the same or different, are each hydrogen, a $PO_3X_2$, $SO_3X$ or $CO_2X$ group or an alkyl or aryl moiety. Examples are units deriving from an of adduct of vinylphosphonic acid (VPA) or vinylidene-1,1-di-phosphonic acid (VDPA) and hypophosphorus acid or a salt thereof. Such groups or units are describes in document EP 861846. Other possible groups or units are described in GB 1458235. These other groups or units can help in detecting the polymer, and/or in having a scale-inhibiting effect.

Styrene sulfonic acid, styrene sulfonates, 4-vinyl benzene sulfonic acid or 4-vinyl benzene sulfonates can help in controlling desorption of the scale inhibiting polymer in so called squeeze treatments, particularly at high temperature and/or high pressure.

Molecular Weight Data and Other Parameters

The polymer according to the invention has preferably a weight-average molecular weight of from 500 to 20000 g/mol, and more preferably of from 1000 to 8000 g/mol. The weight-average molecular weight of the polymer, or copolymer, can be measured by size exclusion chromatography/gel permeation chromatography (GPC). Size exclusion chromatography requires passing a polymer down a GPC packed chromatography column. The pore size in the column is adapted to a specific polymer molar mass range. As the polymer elutes through the column the smaller polymer chains pass into the pores and hence the longer polymer chains are eluted first. Eluted polymer can be detected by a range of detectors including; differential refractive index, ultra-violet, infra-red and exaporative light scattering. The analysis gives the molar mass spread of a polymer sample. Specific statistical molar mass averages (Mw, Mn, Mz) are obtained by comparision of elution times with specialist standard polymers of a low molar mass spread and known molar mass.

Where the scale inhibiting units are polyacrylic acid units, the weight average molecular weight is preferably of from 2000 to 7000 g/mol.

It is further mentioned that the copolymer according to the invention can be supplied in an acid form or neutralized to give a (partly)neutralized salt. Supply pH is determined by a range of factors, including the mineralogy of the formation for a squeeze chemical.

Amounts of Tagging Units within the Polymer

The polymer according to the invention comprises an effective detection amount of the tagging units. For example, for the tagging units the copolymer can have a molar amount of tagging units of up to 5%, but advantageously of from 0.01 to 0.2%.

The scale inhibitor is usually introduced in a composition, for example a fluid, either an inflow stream or a squeezing composition, for example a squeezing fluid.

The fluids are preferably water-based fluids, usually seawater-based fluids, but other fluids are not excluded. For example glycol or glycol ether based solvents can be used. Some useful formulations of fluids for squeeze treatments are provided in document WO 98/30783, which is incorporated by reference.

The scale inhibitor according to the invention may be used in combination with one another, and/or in conjunction with other water treatment agents including: surfactants, such as anionic surfactants (eg. C10-20 alkyl benzene sulfonates, C10-20 olefin sulfonates, C10-20 alkyl sulfates, C10-20 alkyl 1 to 25 mole ether sulfates, C10-20 parafin sulfonates, C10-20 soaps, C10-20 alkyl phenol sulfates, sulfosuccinates, sulfosuccinamates, lignin sulfonates, fatty ester sulfonates, C10-20 alkyl phenyl ether sulfates, C10-20 alkyl ethanolamide sulfates, C10-20 alpha sulfo fatty acid salts, C10-20 acyl sarcosinates, isethionates, C10-20 acyl taurides, C10-20 alkyl hydrogen phosphates), non-ionic surfactants (eg. ethoxylated and/or propoxylated C10-20 alcohols, ethoxylated and/or propoxylated C10-20 carboxylic acids, alkanolamides, amine oxides, and/or C10-20 acyl sorbitan and/or glyceryl ethoxylates) amphoteric surfactants (eg. betaines, sulfobetaines, and/or quaterised imidazolines), and/or cationic surfactants (eg. benzalkonium salts, C10-20 alkyl trimethyl ammonium salts, and/or C10-20 alkyl trimethyl or tris(hydroxymethyl) phosphonium salts); sequestrants, chelating agents, corrosion inhibitors and/or other threshold agents (eg. sodium tripolyphosphate, sodium ethylenediamine tetracetate, sodium nitrilo triacetate, tetra potassium pyrophosphate, acetodiphosphonic acid and its salts, ammonium trismethylene phosphonic acid and its salts, ethylenediamine tetrakis (methylene phosphonic) acid and its salts, diethylenetriamine pentakis (methylene phosphonic) acid and its salts); tolyltriazole and mixtures of nitrate, benzoate, HHP and/or PTCB) biocides (eg. tetrakis (hydroxymethyl) phosphonium salts, formaldehyde, glutaraldehyde); oxidising biocides and/or bleaches (eg. chlorine, chlorine dioxide, hydrogen peroxide, sodium perborate); foam controlling agents such as silicone antifoams; oxygen scavengers such as hydrazines and/or hydroxylamines; pH controlling and/or buffering agents such as amines, borates, citrates and/or acetates; chromium salts; zinc salts; and/or other water treatment agents such as polymeric dispersants and coagulants including polymaleic, polyacrylic and polyvinylsulfonic acids and their salts, starches and/or carboxy methyl cellulose, and/or molybdates. The invention provides formulations comprising an effective amount of a product of the invention as aforesaid and any of the aforesaid known water treatment agents. Such formulations may, for example, contain from 5 to 95% by weight of a product of the invention and from 5 to 90% by weight of one or more of any of the aforesaid water treatment agents.

More particularly, the fluid may further comprise additives chosen from the following:

corrosion inhibitors (imidazoline and quaterantry ammonium salts)

hydrate inhibitors (such as methanol) and cinetic inhibitors such as anti-agglomeration agents, asphaltene inhibitors wax inhibitors biocides (such as THPS, for example marketed by Rhodia as Tolcide® PS)

demulsifiers surfactants, other scale inhibitors.

An aqueous solution of the scale inhibitor can be used in the injection step (squeeze treatment); typically the concentration of scale inhibitor is from 0.5 to 20%, and preferably from 2 to 10% by weight of the aqueous solution. When the production water from the oilwell begins to show decreased levels of the scale inhibitor further squeeze treatments will be required. Generally, effective scale inhibition will be maintained at levels of inhibitor above about 25 ppm (in the production water or in the formation water). The more effective the control of the amount of the scale inhibiting polymer, the lower the level can be of scale inhibitor in the production water before requiring additional treatment. The repeat treatment involves injecting additional aqueous solution of the water-soluble polymer into the underground petroleum-bearing formations at time intervals selected to provide amounts of the water-soluble polymer effective to maintain scale inhibition.

For squeeze treatment applications the fluid may be utilized in conjunction with spearhead chemicals, notably surfactants and/or emulsifiers. These chemicals are usually applied before the squeeze inhibitor to aid adsorption onto the rock and to minimize emulsification problems. Useful formulations and procedures are taught in document WO 98/30783.

It is further mentioned the produced water oil recovery fluid may comprise traces of crude oil or of inorganic residues, that have not been completely separated from the produced fluids.

Amounts (Scale Inhibitor)

The amount of polymer being used usually depend on the application. For squeeze treatment applications, the copolymer will typically be applied downhole as a concentrated solution in an appropriate carrier fluid. Typical concentrations of the inhibitor will be 1-50%, more preferably 5-20% The carrier fluid may be seawater, produced water, aquifer water, membrane treated water, eg desulfated water or mixtures of the above. Alternatively the carrier fluid can be based upon a compatible solvent, for example glycols or glycol ethers.

The minimum inhibitor concentration (MIC) will usually vary with water chemistry but will typically be in the range of 1-500 ppm, with the higher values relevant to the more severe scaling environments.

The invention claimed is:

1. A method for stimulating an oilfield, comprising the steps of:
    a) injecting at least two inflow fluid streams into at least two production zones of an oil producing well linked to the oilfield, respectively, or into at least two oil producing wells, respectively, wherein at least two scale inhibitors having detectable moieties are introduced into the at least two zones or wells, respectively, wherein each of the at least two scale inhibitors corresponds to a different zone or well,
    wherein the at least two scale inhibitors are different from each other, said at least two scale inhibitors comprising different detectable moieties that can be distinguished by analysis;
    b) displacing the oil;
    c) combining at least two outflow streams from the at least two zones or wells to form a combined outflow stream,
    d) recovering the combined outflow stream of fluid comprising the oil and amounts of the at least two scale inhibitors; and
    e) measuring the amounts of the at least two scale inhibitors in the combined outflow stream of fluid, or of a fluid derived therefrom.

2. A method as defined by claim 1, wherein the different scale inhibitors are introduced into the fluid.

3. A method as defined by claim 1, wherein the different scale inhibitors are introduced into the oilfield before stimulating, by forcing said different scale inhibitors into the different oilfields, according to a squeeze treatment, the scale inhibitors being released in the outflow streams.

4. A method as defined by claim 1, wherein the different detectable moieties are selected from the group consisting of:
    a) atom-marked moieties, comprising at least one atom selected from the group consisting of boron, silicon, and germanium,
    b) moieties deriving from acetoxy-styrene, or from ortho-allyl phenol,
    c) moieties deriving from a monomer having the following formula

wherein:
        the radicals X, which may be identical or different, are each a hydrogen atom, or a $C_1$-$C_4$ alkyl radical,
        Y is a hydrogen atom or a $C_1$-$C_4$ alkyl radical,
        Y' is a radical having the formula -L-Arom, wherein:
            L is a covalent bond or a divalent organic linking group optionally comprising heteroatoms, and
            Arom is a group comprising at least two conjugated aromatic rings, said rings comprising conjugated carbon atoms, and optionally nitrogen or oxygen atoms, and, linked to said carbon atoms, hydrogen atoms or other substituents,
    d) moieties obtained by reacting, after polymerization, units deriving from vinyl-benzyl chloride with 8-aminopyrene-1,3,6-trisulfonic acid or, 9-(2-(ethoxycarbonyl)phenyl)-3,6-bis(ethylamino)-2,7-dimethylxanthylium chloride, or 7-amino-4-chloromethylcoumarin, or salts thereof,
    e) moieties deriving from the monomer obtained by reacting vinyl-benzyl chloride with 8-aminopyrene-1,3,6-trisulfonic acid or a salt thereof, f) moieties comprising at least one phosphate or phosphonate group, and g) moieties comprising at least one sulfonate or sulfonic acid group.

5. A method as defined by claim 1, wherein the different scale inhibitors having different detectable moieties are scale-inhibiting polymers comprising scale inhibiting units and different tagging units having the different moieties, wherein the tagging units are selected from the group consisting of:

a) atom-marked units, comprising at least one atom selected from the group consisting of boron, silicon, and germanium, b) units deriving from acetoxy-styrene, or from ortho-allyl phenol, c) units deriving from a monomer having the following formula:

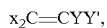

wherein:

the radicals X, which may be identical or different, are each a hydrogen atom, or a $C_1$-$C_4$ alkyl radical, Y is a hydrogen atom or a $C_1$-$C_4$ alkyl radical, Y' is a radical having the formula -L-Arom, wherein:

L is a covalent bond or a divalent organic linking group optionally comprising heteroatoms, and Arom is a group comprising at least two conjugated aromatic rings, said rings comprising conjugated carbon atoms, and optionally nitrogen or oxygen atoms, and, linked to said carbon atoms, hydrogen atoms or other substituents, d) units obtained by reacting, after polymerization, units deriving from vinyl- benzyl chloride with 8-aminopyrene-1,3,6-trisulfonic acid 9-(2-(ethoxycarbonyl)phenyl)-3,6-bis(ethylamino)-2,7-dimethylxanthylium chloride, or 7-amino-4-chloromethylcoumarin, or salts thereof, and e) units deriving from the monomer obtained by reacting vinyl-benzyl chloride with 8-aminopyrene-1,3,6-trisulfonic acid or a salt thereof.

6. A method as defined by claim 5, wherein at least one of the different scale inhibitors is a tagged scale inhibiting polymer comprising tagging units deriving from 9-vinylanthracene.

7. A method as defined by claim 5, wherein the scale inhibiting units derive from monomers selected from the group consisting of:

vinyl sulfonic acid, or vinyl sulfonate salts, vinyl phosphonic acid, or vinyl phosphonate salts, acrylic acid, methacrylic acid, maleic anhydride, maleic acid, styrene-p-sulfonic acid, or styrene sulfonate salts, acrylamido-2-methylpropanesulfonic acids, and mixtures thereof.

8. The method according to claim 5, wherein the acetoxy-styrene is 4-acetoxy-styrene.

9. A method as defined by claim 1, wherein the scale inhibitor is introduced into a water based fluid, or more scale inhibitor is introduced into the fluid, or the scale inhibitor is introduced into the oilfield according to a squeeze treatment.

10. A method as defined by claim 1, wherein the scale-inhibitors can be distinguished by a single analysis method.

11. A method as defined by claim 1, wherein the single analysis method is a fluorometer method.

12. The method according to claim 1, further comprising:

f) addressing a scale formation problem that occurs in at least one of the zones or wells, if the amount of the scale inhibitor which corresponds to the at least one zone or well is below a given value.

13. The method according to claim 12, wherein the step of addressing the scale formation problem comprises: adding the scale inhibitor into the fluid for the zone or well having the scale problem; or adding an additional amount of the scale inhibitor into the fluid; or adding the scale inhibitor into the particular oilfield having a scale problem according to a squeeze treatment.

* * * * *